(12) United States Patent
Rao

(10) Patent No.: US 9,092,794 B2
(45) Date of Patent: Jul. 28, 2015

(54) METHOD OF COLLECTING DATA FROM A SURVEY BY A SYSTEM

(76) Inventor: Bindu Rama Rao, Laguna Niguel, CA (US)

( * ) Notice: Subject to any disclaimer, the term of this patent is extended or adjusted under 35 U.S.C. 154(b) by 410 days.

(21) Appl. No.: 13/554,685

(22) Filed: Jul. 20, 2012

(65) Prior Publication Data

US 2012/0282582 A1    Nov. 8, 2012

Related U.S. Application Data

(63) Continuation of application No. 11/978,851, filed on Oct. 29, 2007, now Pat. No. 8,285,196.

(60) Provisional application No. 60/860,700, filed on Nov. 22, 2006.

(51) Int. Cl.
*H04H 9/00* (2006.01)
*G06Q 30/02* (2012.01)

(52) U.S. Cl.
CPC ...................... *G06Q 30/02* (2013.01)

(58) Field of Classification Search
CPC .............. G06Q 30/02; G06Q 30/0201; G06Q 30/0202; G06Q 30/0203; G06Q 30/0204; G06Q 30/0205; G06Q 30/0206; G06Q 30/0207; G06Q 30/0241; G06Q 30/0242; G06Q 30/0245; G06Q 30/0251; G06Q 30/0255

USPC ............ 455/2.01, 3.04, 3.05, 3.06, 557, 424, 455/425, 456.5, 456.6, 414, 466; 702/179, 702/10, 14; 725/13, 9, 11, 110, 134, 62; 709/203, 217, 812; 707/748; 705/10, 9, 705/14, 7; 713/200
See application file for complete search history.

(56) References Cited

U.S. PATENT DOCUMENTS

| | | | |
|---|---|---|---|
| 6,721,713 B1* | 4/2004 | Guheen et al. ................. 705/1.1 |
| 8,270,893 B2* | 9/2012 | Rao ............................... 455/2.01 |
| 2003/0144899 A1* | 7/2003 | Kokubo .......................... 705/10 |
| 2004/0064351 A1* | 4/2004 | Mikurak ........................... 705/7 |
| 2005/0028005 A1* | 2/2005 | Carson et al. ................. 713/200 |
| 2006/0155513 A1* | 7/2006 | Mizrahi et al. ................ 702/179 |
| 2008/0010351 A1* | 1/2008 | Wardhaugh et al. .......... 709/206 |
| 2009/0240569 A1* | 9/2009 | Ramer et al. .................... 705/10 |
| 2010/0094878 A1* | 4/2010 | Soroca et al. ................. 707/748 |

* cited by examiner

*Primary Examiner* — Tan Trinh

(57) ABSTRACT

An electronic infrastructure consisting a plurality of client mobile devices, a distribution server and network that communicatively couples the plurality of client mobile devices and distribution server, wherein the distribution server collects survey questionnaires from a questionnaire source, distributes survey questionnaire to the plurality of client mobile devices. Then, the distribution server receives responses from the users of plurality of client mobile devices and analyzes the responses based upon several criteria. The criteria include region based analysis, race based analysis, age based analysis, other criteria based analysis, high priority analysis and/or satisfaction level analysis.

14 Claims, 10 Drawing Sheets

METHOD OF COLLECTING DATA FROM A SURVEY BY A SYSTEM

CROSS REFERENCES TO RELATED APPLICATIONS

The present application is a continuation of U.S. non-provisional patent application Ser. No. 11/978,851, issued as U.S. Pat. No. 8,285,196, entitled "MOBILE DEVICE AND DISTRIBUTION SERVER FOR SURVEYS USING INTERACTIVE MEDIA", filed on Oct. 29, 2007, which in turn makes reference to and claims priority to U.S. non-provisional patent Ser. No. 11/821,771, issued as U.S. Pat. No. 8,135,331, entitled "SYSTEM FOR PROVIDING INTERACTIVE USER INTEREST SURVEY TO USER OF MOBILE DEVICE", filed on Jun. 25, 2007. The complete subject matter of each of the above U.S. patent applications are hereby incorporated herein by reference, in their respective entirety.

This patent application makes reference to U.S. provisional patent Ser. No. 60/860,700, entitled "AUDIO GUIDED SYSTEM FOR PROVIDING GUIDANCE TO USER OF MOBILE DEVICE ON MULTI-STEP ACTIVITIES", filed on Nov. 22, 2006. The complete subject matter of the above-referenced United States Patent Application is hereby incorporated herein by reference, in its entirety.

This patent application makes reference to U.S. Provisional Patent Application Ser. No. 60/524,568, entitled "QUESTIONNAIRE NETWORK FOR MOBILE HANDSETS," filed on Nov. 24, 2003. The complete subject matter of the above-referenced United States Provisional Patent Application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States Patent Application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional Patent Application is hereby incorporated herein by reference, in its entirety.

The patent application makes reference to, claims priority to, and claims benefit of U.S. non-provisional patent Ser. No. 11/821,771, entitled "SYSTEM FOR PROVIDING INTERACTIVE USER INTEREST SURVEY TO USER OF MOBILE DEVICE", filed on Jun. 25, 2007. The complete subject matter of the above is hereby incorporated herein by reference, in its entirety.

BACKGROUND

1. Technical Field

The present invention relates generally to Internet infrastructures; and, more particularly, to distribution of surveys and processing data from surveys.

2. Related Art

Widespread usage of mobile devices (or cell phones) and vastly improved performance of these mobile devices allow programmers to envisage evermore sophisticated applications to be written. Many of today's mobile devices run on a platform of operating systems written specifically for them, and have multiple applications written to be run using these operating systems. These applications include (other than voice communication) keeping record of appointments and schedules, storing addresses, presenting calendars, surfing Internet, playing games among many other, and can be run from any convenient location.

Today's mobile devices play music and other audio clips (such as mp3), and also play video clips and movies (such as mp4). They can be networked with external devices such as other mobile phones, laptops and personal computers via infrared or Bluetooth. They can also communicatively couple with external servers via Internet using Wi Fi interfaces and built in modems.

Mobile devices come with wide variety of features, some have small screens and few soft (programmable) keys while many others have larger screens with multiple soft keys. They are also available with alpha numeric keyboards or with keypad on the screen that are operated using a stylus.

Application for these mobile devices are written using one of many programming languages available, and some of these applications are capable of processing content provided as XML (eXtensible Markup Language) documents. These applications or programs may be built into the hardware (ASIC or embedded applications, for example), using permanent memories of these mobile devices. They can also be downloaded into the devices using a flash memory or from an external server via Internet. Then, they can be run on mobile devices once downloaded and when the applications are no longer required, they can be erased automatically or manually. These programs accomplish many tasks such as managing daily tasks, assisting marketing, keeping data and files stored, managing databases etc.

Quite often, product marketing organizations and branding companies send product information to people over common postal services. Such means of distributing product information is expensive and time consuming. Often, marketing organizations send product preference inquiries, questionnaires, and user surveys to people who have purchased one of their products. Typically recipients ignore them as they have very limited incentives to complete them and return them for the time and energy it takes to complete them, mail them at a port office, etc. Thus marketing companies have limited success in getting questionnaires and surveys answered by people to whom they have mailed them. Recently, some marketing companies have resorted to emailing surveys to their customers. Such surveys get lost in the plethora of emails and junk mail people usually receive in their email box. Thus, the success rate is only marginally better than sending such questionnaires and surveys out by regular post. A better mechanism is needed that ensures a better response rate for such questionnaires and surveys. Even when a survey sent out to a user via regular post is received back with a user's response, it has to be scanned by a scanning machine to enter into a database, or manually processed for data entry into a database for subsequent processing/analysis. Both options are expensive needing new equipment or data entry systems and often involve human intervention/processing. Quite often, the long multiple question surveys sent over email to a user are not compatible with a mobile phone, and often unusable from a mobile phone due to limited screen sizes and almost unusable (if not cumbersome and limiting) on a mobile phone with small keyboard and keys to which 3 or 4 letters are mapped (overloaded keys on keyboard).

Often, questionnaires, which comprise a list of questions, usually in printed form, are submitted to one or more individuals for replies that can be analyzed for usable information subsequently. Gathering responses from questionnaires involves a lot of human intervention and costs in terms of equipment costs and personnel costs. Questionnaires are often a form containing a set of questions, especially one addressed (sent) to a statistically significant number of subjects, as a way of gathering information for a survey on some specific topic/issue. To conduct a survey of an issue often involves gathering a sampling, or partial collection, of facts, figures, or opinions taken and using that to approximate or indicate what a complete collection and analysis might reveal. Conducting a survey often involves sending questionnaires and gathering responses and analyzing them.

Often, when a survey response is received, it is not accompanied by any information or very limited information, such as a user's name, about the responder. Thus, it is not possible to discern much about the user and about why the user has responded the way the user did. Users are also reluctant to provide a lot of personal details over and over again for different surveys and questionnaires. Polling related questionnaires and election issue related questionnaires, in particular, are of very limited use because not much is known about the responder.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
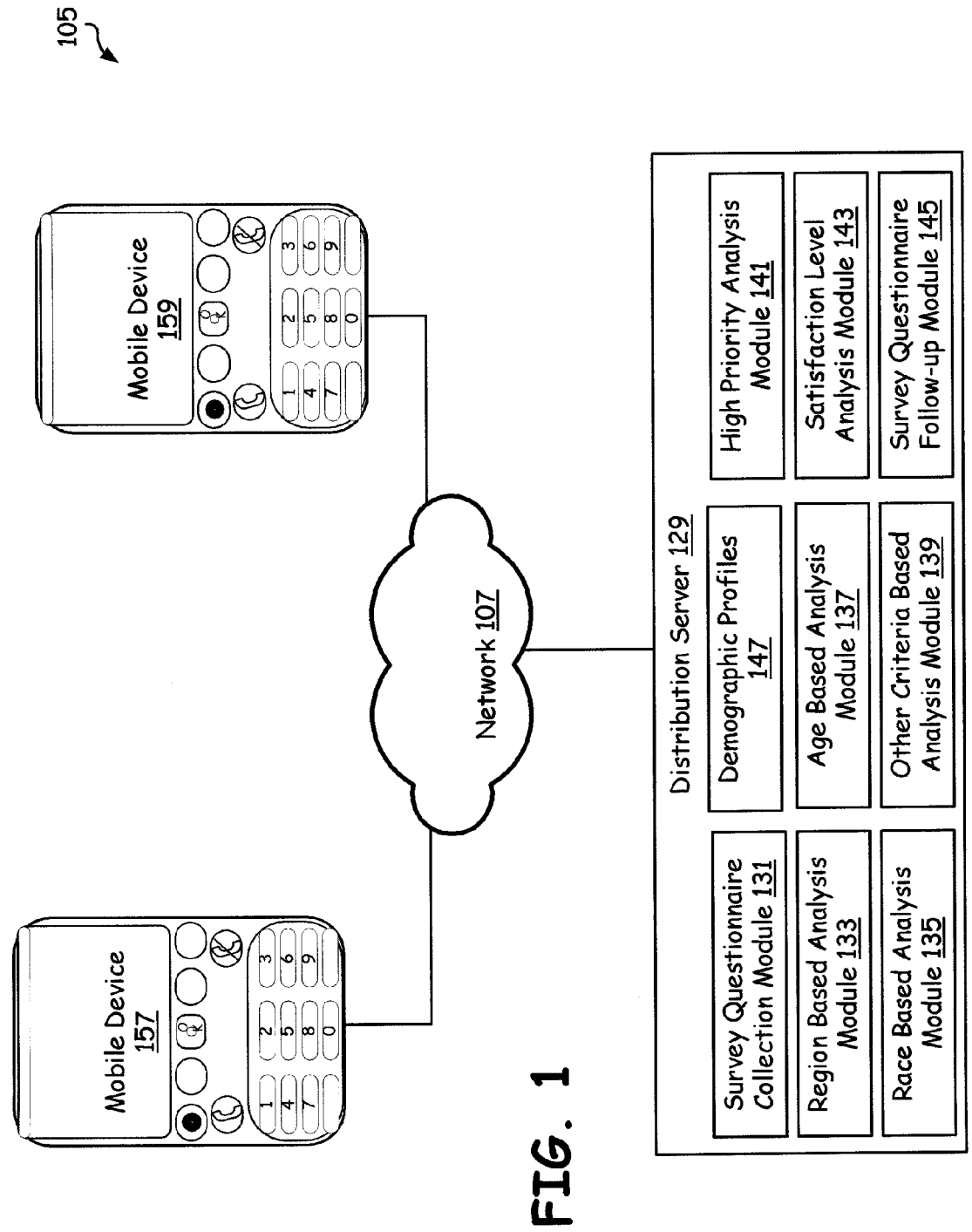
FIG. 1 is a schematic block diagram illustrating an electronic infrastructure containing a plurality of client mobile devices and distribution server, wherein the distribution server distributes survey questionnaire to the plurality of client mobile devices, receive responses and analyze them.

FIG. 1 is a schematic block diagram illustrating an electronic infrastructure 105 containing a plurality of client mobile devices 157, 159 and a distribution server 129, wherein the distribution server 129 distributes surveys and questionnaires to the plurality of client mobile devices 157, 159, receives responses from them, and analyzes the responses. In specific, the distribution server 129 gathers surveys and questionnaires from one or more questionnaire sources, optionally inserts criteria tags and delivers them to the client mobile devices 157, 159. The client mobile devices 157, 159 display the contents of the survey or questionnaire, collect user responses and deliver them back to the distribution server 129. A gathering of a sample of data or opinions considered to be representative of a whole is typically obtained by conducting a survey, and the present invention facilitates such gathering of a sample of data or opinions.

The distribution server 129 analyzes the responses received by diverting the responses to appropriate criteria based analysis modules and sends the analyzed responses back to the questionnaire source. The questionnaire source may be any personal computer or laptop computer, the user of which logs into the distribution server 129, makes necessary payments for the services and delivers survey questionnaire to the distribution server 129. The criteria tags are tags that assist the distribution server 129 to identify the type of analysis required. For example, the criteria tags may indicate region based analysis, race based analysis, age based analysis, other criteria based analysis, high priority analysis and/or satisfaction level analysis. The survey questionnaire may be presented as one question per screen with multi choice answers, or multiple questions per screen in a tabular form.

The survey questionnaire criteria determines what type of analysis is to be performed on responses obtained from a given set of survey questions. The region based analysis includes statistical analysis on the basis of regional spread of answers. In other words, the survey questionnaire answers are analyzed by region, such as Northeast, Midwest, South and West. By this analysis the user of the questionnaire source gets information on regional trends. For example, the region based analysis specifies states that belong to the regions tallies up subtotals by the regions.

Survey questions typically provide simple "agree", "disagree" and "no response" answers to choose from. The present invention supports gathering and analyzing such responses. Alternatively, the answers may have "strongly agree", "somewhat agree", "somewhat disagree", "strongly disagree" or "no response". The present invention also supports gathering and analyzing these type of responses. The survey totals are in terms of number of responses (numbers) for each of those choices, and the percentages too. Then, these responses are analyzed (typically by the distribution server 129) by region with total numbers and percentages for each region, for each of the choices. Then statistical methods are applied on the responses to arrive at various statistical figures that are required by business, scientific, political and other entities for further interpretations of the results/analysis. In addition, the same responses may be analyzed by age group, with (for example) groups of 18-24, 25-34, 35-54, 55-69, and 70+.

Similarly, the responses are analyzed by the distribution server 129 with correlation to other behavior of the users, such as responders that shop at a certain departmental store such as Wal-Mart, those that espouse a preference for one political party or another, and those that have various levels of education (less than High school, HS graduate, Some College, College+, doctorate degree, etc.).

Analyzing responses, by the distribution server 129, for Agree/Disagree type questions based on race involves questions that seek users' responses in terms of Agree/Disagree/No Response, in that the results are analyzed by the race of the respondents. For example, correlation to race such as White, Hispanic, Asian, African American, Other can be provided by the distribution server 129 with total numbers and percentages of total responses of each choice. Then, statistical methods are applied on the responses to arrive at various statistical figures, for further interpretations of the analysis.

Analyzing responses for Agree/Disagree/No Response type of questions based on other criteria involves survey questions based on ideology, military background, football team affiliations, affiliations to sport teams, etc. Again, statistical methods are applied on the responses to arrive at various statistical figures.

The analysis of survey questions that ask respondents to select high priority ones from a list of issues presented involve prompting users of the client mobile devices 157, 159 to rate or select top two of the answers in a list of issues presented. The first and second choices of users may be reported to the distribution server 129, along with combination of first and second selections for each of the issues. Alternatively, the users may be requested to prioritize the entire answer sets from 1 through 5, for example.

Analyzing questions that ask users to select a satisfaction level for an issue (for example, performance of a politician) involves soliciting satisfaction level by providing choices such as very satisfied, somewhat satisfied, somewhat dissatisfied, very dissatisfied, and don't know/refuse to answer, the responses are totaled for similar responses. For example, the totals for very satisfied and somewhat satisfied are added and reported too, and so are totals for somewhat dissatisfied and very dissatisfied.

A network 107 such as combination of Internet and mobile networks communicatively couple the client mobile devices 157, 159 to the distribution server 129. To fulfill various aspects of the present invention, the distribution server 129 contains a plurality of modules. The distribution server 129 contains survey questionnaire collection module 131 that gathers survey questionnaire from various sources (a questionnaire source), tags them and distributes them to a plurality of client mobile devices 157, 159. The tagging (criteria tags) may include region, race, age, other criteria, high priority and satisfaction level, among other possibilities. The criteria tag information is obtained from questionnaire source and may include one or more tags per each set of questionnaire. The questionnaire source may be users of the distribution server 129 who login to the server to have a survey done on various issues that are pertinent to them. The users of the distribution server 129 also provide criteria for statistical analysis, the results of such analysis are delivered back to them once the survey and analysis are completed. The survey questionnaire collection module 131 also gathers client mobile device 157 or 159 user information such as those that shop at a certain departmental store such as Wal-Mart, those that espouse a preference for one political party or another, and those that have various levels of education (<High school, HS graduate, Some College, College+), as relevant to the survey questionnaire.

In addition, to analyze based upon certain criteria tag, the distribution server contains criteria based analysis modules such as region based analysis module 133, race based analysis module 135, age based analysis module 137, other criteria based analysis module 139, high priority analysis module 141 and satisfaction level analysis module 143. Once responses are received by the distribution server 129 from the plurality of client mobile devices 157, 159, the responses are diverted to appropriate criteria based analysis modules 133, 135, 137, 139, 141 and/or 143 for further statistical analysis of the responses. A survey questionnaire follow-up module 145 gathers results of the analyses from the criteria based analysis modules 133, 135, 137, 139, 141 and/or 143, formats them to a presentable form and sends them back to the corresponding user of the distribution server 129. The user of the distribution server 129 may login and view the results or the results may be sent to the user via email.

In one embodiment of the present invention, an external server (not shown) is the questionnaire source. The external server also does analysis of the responses, while the distribution server 129 just delivers survey questionnaire to plurality of mobile devices 157, 159 and sends responses back to the external server. In this embodiment, the distribution server is much more simplified. In addition, the survey questionnaire may have an audio preamble, with multiple choices provided in audio form and the responses are received in the form of clicking choices 1 though 3 (agree, disagree and no response, respectively), for example. In another embodiment, the presentation of survey questionnaire may take form of audio-visual presentation with multiple choices provided. The user may be provided with options to choose between textual presentation, audio presentation or audio-visual presentation. In addition in survey questionnaire where a perspective of one party (such as a political party or business view point), the distribution server 129 may also provide an option to view an opposing perspective (or view point) before the user makes up his mind to answer the questions.

For example, a user of the distribution server 129 may be a scientist who wants certain statistical analysis of people as related to a disease. The user prepares a list of survey questionnaire in a format that is in accordance with the present invention (refer to FIGS. 2 through 9 for detailed description of various formats and analysis criteria) and submits them to the distribution server 129. The distribution server 129 distributes the list of survey questionnaire after adding relevant criteria tags, and then gathers responses. These responses are diverted to one or more of criteria based analysis modules 133, 135, 137, 139, 141 and/or 143 for appropriate analyses as requested by the user of the distribution server 129 and the results are formatted in a presentable manner and delivered back to the user by the survey questionnaire follow-up module 145.

In one embodiment, the distribution server 129 is employed for organization of political campaigns and distributing questionnaires related to political campaigns for various elections, such as presidential elections. The questionnaires are sent to one or more individuals onto their mobile devices, as part of a survey of voter sentiments on particular issues. When voter responses are received, they are analyzed for regional spread of answers. This involves analyzing responses by region, such as Northeast, Midwest, south, west, etc. Thus, it if possible for a campaign to get information on regional trends. In particular, the distribution server 129 makes it possible to specify states that belong to the regions, and also to tally up subtotals by the regions. The distribution server also is capable of analyzing responses for Agree/Disagree type questions. For such questions, for each question in the questionnaire, typical responses can be Agree, Disagree, and No Response. The totals can be in terms of number of responses (numbers) for each of those choices, and the percentage too. Then these responses can be analyzed by region with total numbers and percentages for each region for each of the choices. Furthermore, the same responses can be analyzed by age group, for example employing age groups of 18-24, 25-34, 35-54, 55-69, and 70+.

Similarly, the responses to questionnaires can be analyzed with correlation to other behavior of the users, such as those that shop at a certain dept. store such as Wal-Mart, those that espouse a preference for one political party or another, and those that have various levels of education (<High school, HS graduate, Some College, College+).

The distribution server 129 also makes it possible to analyze responses for Agree/Disagree type questions based on race. This makes it possible to determine if individuals of a particular race have a certain disposition towards agreement on certain issues. When questions that seek users' responses in terms of Agree/Disagree/NS, the results can be analyzed by the race of the respondents. For example, correlation to race such as White, Hispanic, Asian, African American, other can be provided with total numbers and percentages of total responses of each choice. It is also possible to analyze responses to Agree/Disagree type questions based on other criteria. Such criteria for analyzing user responses to Agree/Disagree/NS type questions can be ideology, military background, football team affiliations, affiliations to sport teams, etc.

Analyzing questions that ask respondents to select high priority ones from a list of issues presented makes it possible for a candidate to determine which issue interests the voters the most. In some questions, a list of issues are presented and the respondent is prompted to a rate or select the top 2 (or so) issues. The 1st and 2nd choices of respondents can be reported by the distribution server 129, along with combination of 1st and 2nd selections for each of the issues.

Quite often, a satisfaction level question is asked of voters to determine if they are satisfied with the performance of a current government or satisfied with a certain policy position. Analyzing questions that ask respondents to select a satisfaction level for an issue or performance of a politician is also supported by the distribution server 129. When a satisfaction level is solicited with choices being Very satisfied, Somewhat satisfied, Somewhat not satisfied, Very unsatisfied, and Don't know/refused, the responses can be totaled for similar responses. For example, the totals for very satisfied and somewhat satisfied can be added and reported too, and so are totals for somewhat not satisfied and very unsatisfied.

The distribution server 129 also comprises a demographic profiles database or collection 147 which is employs to analyze the responses received from users to questionnaires/surveys. It also employs that to selectively target individual users, in a related embodiment, for questionnaires and surveys. In a different embodiment, demographic profiles database or collection 147 comprises references to demographic profile stored externally at a different server or database, to which access is acquired as needed.

In one embodiment, to provide an incentive for respondents to not only provide answers to a questionnaire but also provide details of themselves—sort of a responder demographic profile, the responders are provided with free SMS services (such as 10 free SMS messages), free ring tones or free data services for a month or a free mobile TV services for a period. When a responder provides responses to a questionnaire, if he also provides a responder demographic profile information, or access and a reference (such as an URN) to one stored at a server (the distribution server 129 or some other server), the responder is awarded the incentive associated, and the distribution server 129 notifies the responder, and also manages the delivery of the services (or product) associated.

In general, the client mobile devices 157, 159 store a user's demographic profile, or a reference to it, which they communicate to the distribution server selectively along with responses to questionnaires/surveys. In one embodiment, the demographic profile is devoid of any user identification (such as name, address, Social security number, etc.) that may be misused by unauthorized users. Instead, in this embodiment, demographic profile comprises data such as race information, political affiliations, age information, salary information, family size information, etc.

In general, the client mobile devices 157, 159 retrieve a user's demographic profile from a website, such as the one used to register their accounts for interactions with the distribution server 129. The client mobile devices 157, 159 retrieve such user's demographic profile and store them locally to be reused for all questionnaires, to be provided selectively, when requested, with their authorization/permission, to the distribution server 129 along with responses to questionnaires. In one embodiment, the client mobile devices 157, 159 locally store a reference (such as a username or identification) to the demographic profile stored in a server, such as a web portal associated with the distribution server 129 or at the distribution server 129. They then provide the locally stored reference along with responses to questionnaires, typically when a request is made for such demographic information in configuration information for questionnaires, such as in configuration information in XML files comprising the questionnaires. For example, the users of the client mobile devices 157, 159 may register at a web portal provided by or associated with the distribution server 129, provide demographic information, obtain a username or identification for their account, then use that username or identification in responses provided to questionnaires in order to enable access to their pre-created (created once and reused in all questionnaires) demographic information. Thus, the distribution server 129 (or alternate servers used to analyze responses), on receiving the responses to questionnaires along with a reference to the demographic information (such a reference can be an URI, a username an identification, etc.) retrieves the required demographic profiles using the references provided and analyzes the responses.

Although the present invention is described in terms of client mobile devices 157,159, it should be clear that the present invention applies to any electronic devices that receive questionnaires and enable a user to respond to those questionnaires. Such electronic devices typically comprise a communication circuitry and at least one non-volatile memory having stored therein one or both of firmware and software. They also comprise at least one processor operably coupled to the non-volatile memory and a demographic profile reference stored in the non-volatile memory. The processor(s) employ the communication circuitry to communicate with a distribution server. The distribution server supports delivery of a questionnaire to the electronic device and it also processes responses from the electronic device. The electronic device receives a questionnaire from the distribution server and displays it to a user. It also receives the user's input and gathers a response. It then communicates the response to the distribution server along with the demographic profile stored in the electronic device or a reference to such demographic profile stored externally in a server, a portal, a database, etc. If the questionnaire is accompanied by a demographic profile reference, the electronic device does not change that and, instead, returns the same demographic profile reference with the user's response. Otherwise, if the questionnaire itself is not accompanied by a demographic profile reference, the electronic device returns the locally stored demographic profile reference (or the locally stored demographic profile data) with the user's responses.

In one embodiment, such an electronic device employs a communication circuitry available to communicate with a distribution server 129 that supports delivery of a questionnaire to the electronic device, the distribution server 129 also being capable of processing responses from the electronic device. The electronic device receives a questionnaire from the distribution server 129 and displays it to a user. The electronic device receives the user's inputs to the various questions and gathers a response. The electronic device communicates the response to the distribution server 129 along with the demographic profile reference. The demographic profile reference can be a URN to a demographic data for the user stored locally in the electronic device, or stored remotely at a web portal, a server, a database, etc. The distribution server 129 retrieves the demographic data for the user (if necessary, and as necessary) to analyze the response and categories the response.

Questionnaires displayed by the client mobile devices comprise of multiple choice questions where a user has to select one or more of the choices presented for each question. Questionnaires also comprise of question sets presented in multiple rows of a tabular form wherein, for the entire set, a valid set of choices or answers are applicable. For example, a set of choices "agree", "disagree", "don't care", with index values 1, 2 and 3 can apply to a set of 10 questions presented in a tabular form, wherein, for each question in the set, the user can enter/select a value of 1, 2 or 3 corresponding to the choices presented.

Tables are often employed in traditional Internet based questionnaires, wherein a user is asked to select one of a set of standard responses for a list of issues. Unfortunately, such a table is inappropriate for a mobile device, especially if the set of standard responses, often presented as columns, is large. This is due to several reasons including ease of use problems or readability problems. The present invention makes it possible to present tables of questions, each that can be answered with one of a common set of multiple choice answers, by converting such tables into a set of one questions that require on single numeric (for example an index) entry of an answer wherein the numeric entry corresponds to an identification or position of the associated multiple choice entry in the multiple choice presented at the beginning (for the set) and presented whenever requested (by activating a menu item). Thus, in one embodiment, for the tables with common set of multiple choice answers, the distribution server 129 converts that into a format where the multiple choice answers, each with a numeric reference or an index, are presented first, followed by a set of questions that accept the numeric entry for the user's selections, accompanied by a supplementary window of information (that can be displayed whenever necessary) that comprises the multiple choice answers too, for easy reference.

In one embodiment of the present invention, the distribution server 129 makes it possible to support questionnaires with 2-dimensional tables, wherein questions are in the rows of the tables and multiple choice answers that are common to all the questions is in the columns of the table. The distribution server 129 facilitates by modifying its structure, and instead of using a table for a user to view, a list of issues is displayed, one per row, with each issue/row also providing for a text entry that accepts a numeric entry. The numeric entry is provided so that a user could entry a value indicating the selection of one specific response from the selection of responses (for example an index corresponding to one of the multiple choice selections). The selection of responses (i.e. the allowed responses) are displayed first along with an corresponding index or ordinal value (or other numbering schemes) just preceding the display of the list of questions (perhaps with one question per issues) in the questionnaire. In one embodiment, the selection of responses (the multiple choices available, for example) are also provided as supplementary information for the corresponding item (the set of questions) of the questionnaire that can be optionally viewed (or listened to in audio) by the user.

For some questions in a questionnaire that are flagged as "savable", the client mobile devices 157, 159 provide a screen that comprises a "Save Image" menu item for the user to save the current image displayed, and the "Save audio" menu item, to save the current audio. Both should be saved in local flash memory. The saved files are stored in a user data segment where the user can find them later using file manager, etc. Being data driven, the screen displaying such questions with "savable" items provide the additional menu items that help a user save audio, video, text and images, if any. This feature is useful for some interesting activities, such as a user saving an audio jingle and an image from a mobile advertisement inserted into a questionnaire as one of the items in the questionnaire (with some downloadable content such as an image, an audio, etc.).

The present invention can be used in election campaigns to send out questionnaires with a candidates stated positions and questions soliciting a voter's feedback on the candidates stated positions/issues of interest. The distribution server 129 supports creating a survey questionnaire for an election campaign. It also supports uploading a survey questionnaire created on a PC using an appropriate tool. The questions of the survey questionnaire is aimed at a candidate's issues and each question of the survey questionnaire comprises the candidate's voice statement, a multiple choice selection and a textual description. The distribution server 129 supports managing the election campaign for an election by determining a plurality of voters as targets for the survey questionnaire based on their demographic profile data.

Figure 2:
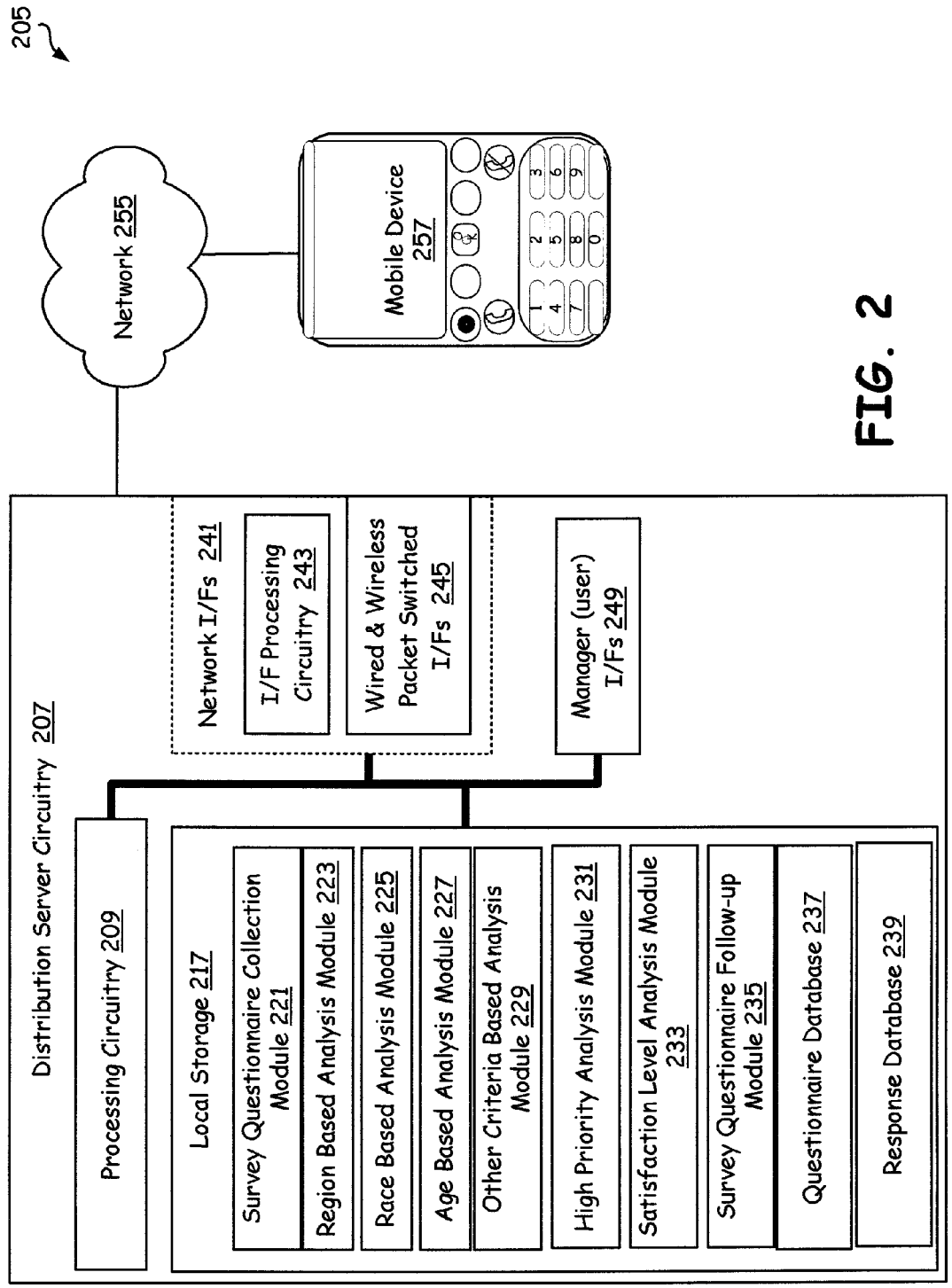
FIG. 2 is a schematic block diagram illustrating components of the distribution server constructed in accordance with the embodiment of FIG. 1 of the present invention.

FIG. 2 is a schematic block diagram illustrating components of the distribution server constructed in accordance with the embodiment of FIG. 1 of the present invention. The distribution server circuitry 207 may in part or full be incorporated into any computing device that is capable of serving as an Internet based server. The distribution server circuitry 207 generally includes processing circuitry 209, local storage 217, manager interfaces 249 and network interfaces 241. These components communicatively coupled to one another via one or more of a system bus, dedicated communication pathways, or other direct or indirect communication pathways. The processing circuitry 209 may be, in various embodiments, a microprocessor, a digital signal processor, a state machine, an application specific integrated circuit, a field programming gate array, or other processing circuitry.

Local storage 217 may be random access memory, read-only memory, flash memory, a disk drive, an optical drive, or another type of memory that is operable to store computer instructions and data. The local storage 217 includes a survey questionnaire collection module 221, region based analysis module 223, race based analysis module 225, age based analysis module 227, other criteria based analysis module 229, high priority analysis module 231, satisfaction level analysis module 233, survey questionnaire follow-up module 235, questionnaire database 237 and response database 239, to facilitate collection and distribution of survey questionnaire, criteria based analysis of the responses and delivery of results, in accordance with the present invention.

The network interfaces 241 contain wired and wireless packet switched interfaces 245 and may also contain built-in or an independent interface processing circuitry 243. The network interfaces 241 allow the distribution server 207 to communicate with client mobile devices such as 257. The manager interfaces 249 may include a display and keypad interfaces. These manager interfaces 249 allow the user at the distribution server 207 to control aspects of the present invention. The client mobile device 257 illustrated is communicatively coupled to the distribution server 207 via a network 255.

The survey questionnaire collection module 221 collects survey questionnaire sets from a questionnaire source, includes criteria tags (such as region, race, age, other criteria, high priority and satisfaction level, as given by the questionnaire source) and distributes them to the client mobile device 257. Alternatively, an external server (not shown) may format the survey questionnaire, include tags and deliver such sets to the survey questionnaire collection module 221. The survey questionnaire collection module 221 also collects user information from the client mobile device 257 as relevant to the survey questionnaire.

The criteria based analysis modules, that is, region based analysis module 223, race based analysis module 225, age based analysis module 227, other criteria based analysis module 229, high priority analysis module 231 and satisfaction level analysis module 233, process the responses that are received by the distribution server 207 appropriately and perform statistical analysis of the responses. Alternatively, an external server (not shown) may perform statistical analysis of the responses as appropriate, in this case the distribution server 207 bypasses the criteria based analysis modules 223, 225, 227, 229, 231 and/or 233. The survey questionnaire follow-up module 235 gathers results of the analyses from the criteria based analysis modules 223, 225, 227, 229, 231 and/or 233, formats them to a presentable form and sends them back to the corresponding user or an external server. The questionnaire database 237 keeps data pertaining to the survey questionnaire and response database 239 keeps record of the responses for future use.

In other embodiments, the distribution server 207 of the present invention may include fewer or more components than are illustrated as well as lesser or further functionality. In other words, the illustrated distribution server is meant to merely offer one example of possible functionality and construction in accordance with the present invention.

Figure 3:
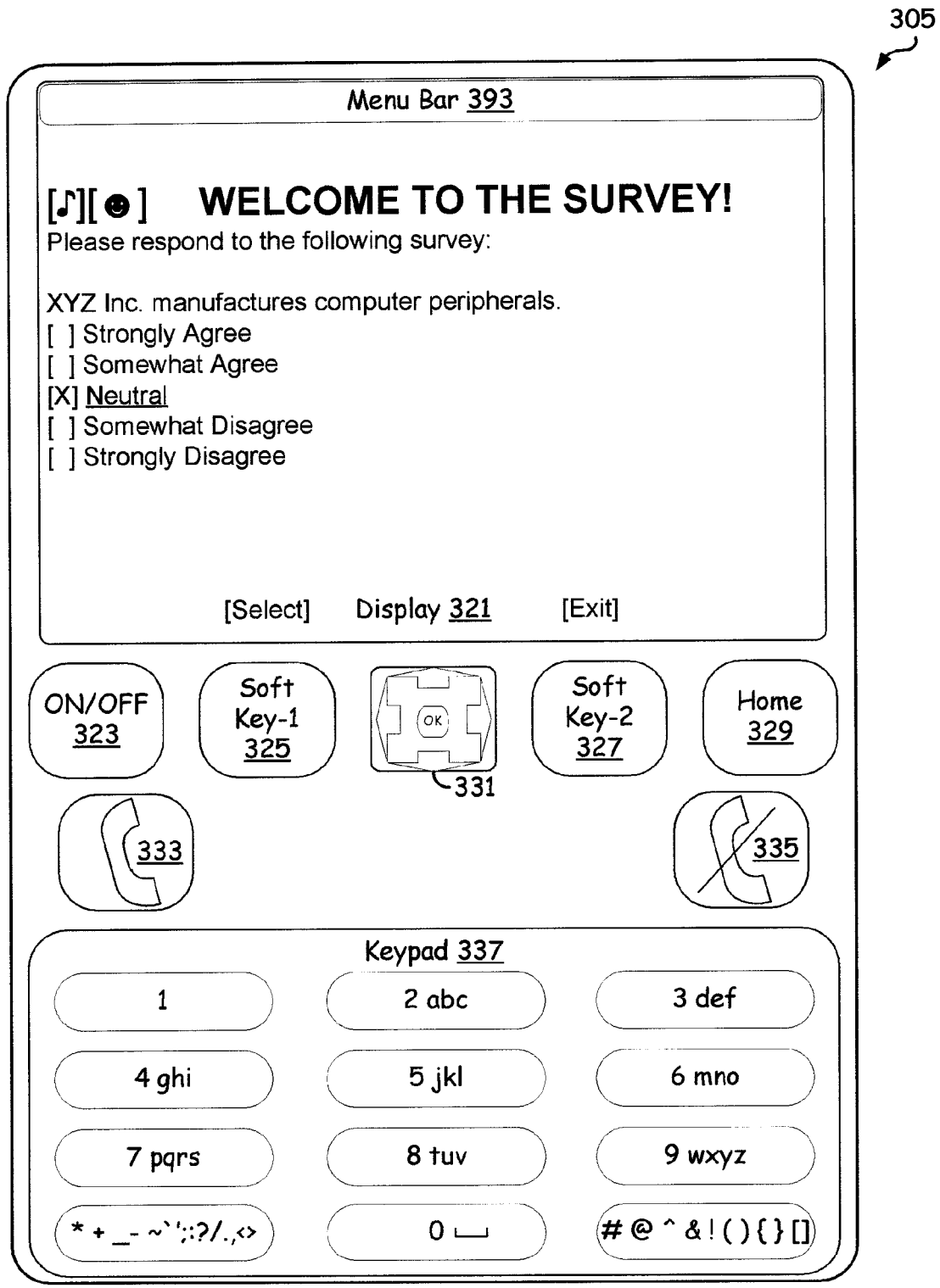
FIG. 3 is an exemplary schematic block diagram illustrating snap shot of a client mobile device displaying a survey questionnaire having region analysis tag.

FIG. 3 is an exemplary schematic block diagram illustrating snap shot of a client mobile device 305 displaying a survey questionnaire having region analysis tag. In the illustration, only two soft keys 325, 327 are considered, however many client mobile devices may have more than two soft keys which may be utilized in designing survey questionnaire. A typical client mobile device 305 has a keyboard 337 containing alpha-numeric keypad, an 'ON/OFF' button 323, scrolling keys (up, down, right and left) 331, 'home' button 329, 'call' button 333, 'end call' button 335, soft keys 325, 327 and a display 321. The display 321 contains a menu bar 393 and a display area that in the current illustration shows an exemplary survey questionnaire with region analysis tag.

The illustration shows a title such as 'WELCOME TO THE SURVEY!'. The screen also contains a helpful text such as 'Please respond to the following survey:'. Additional information about the purpose of the survey may be provided in prior screens. The survey questionnaire illustrated exemplifies a typical business related survey questionnaire wherein the user of the distribution server (129 of FIG. 1) expects region based analysis of the responses. The questionnaire reads 'XYZ Inc. manufactures computer peripherals.', and the multi choice answers given are 'Strongly Agree', 'Somewhat Agree', 'Neutral', 'Somewhat Disagree' and 'Strongly Disagree'. The user may select a choice such as neutral (as illustrated) by scrolling using buttons 331 and selecting by using soft key-1 325 or exit from the survey by clicking on soft key-2 327. Once selected, the distribution server may present next of the survey questionnaire automatically, user of the client mobile device 305 may exit from the survey anytime though. In addition, a selectable icon such as '[♪]', when selected plays audio version of the survey questionnaire and allows the user to select one of multi choice answers in response to the audio questionnaire. Similarly, if available, a selectable icon such as '[●]', when selected plays audio-visual presentation of the survey questionnaire and allows the user to select one of multi choice answers in response.

In this case of region based analysis, the distribution server analyses the responses statistically based upon the responses from a plurality of client mobile devices. The regions may be, for example, states within a region, relevant user profile for such an analysis is also collected by the distribution server.

Figure 4:
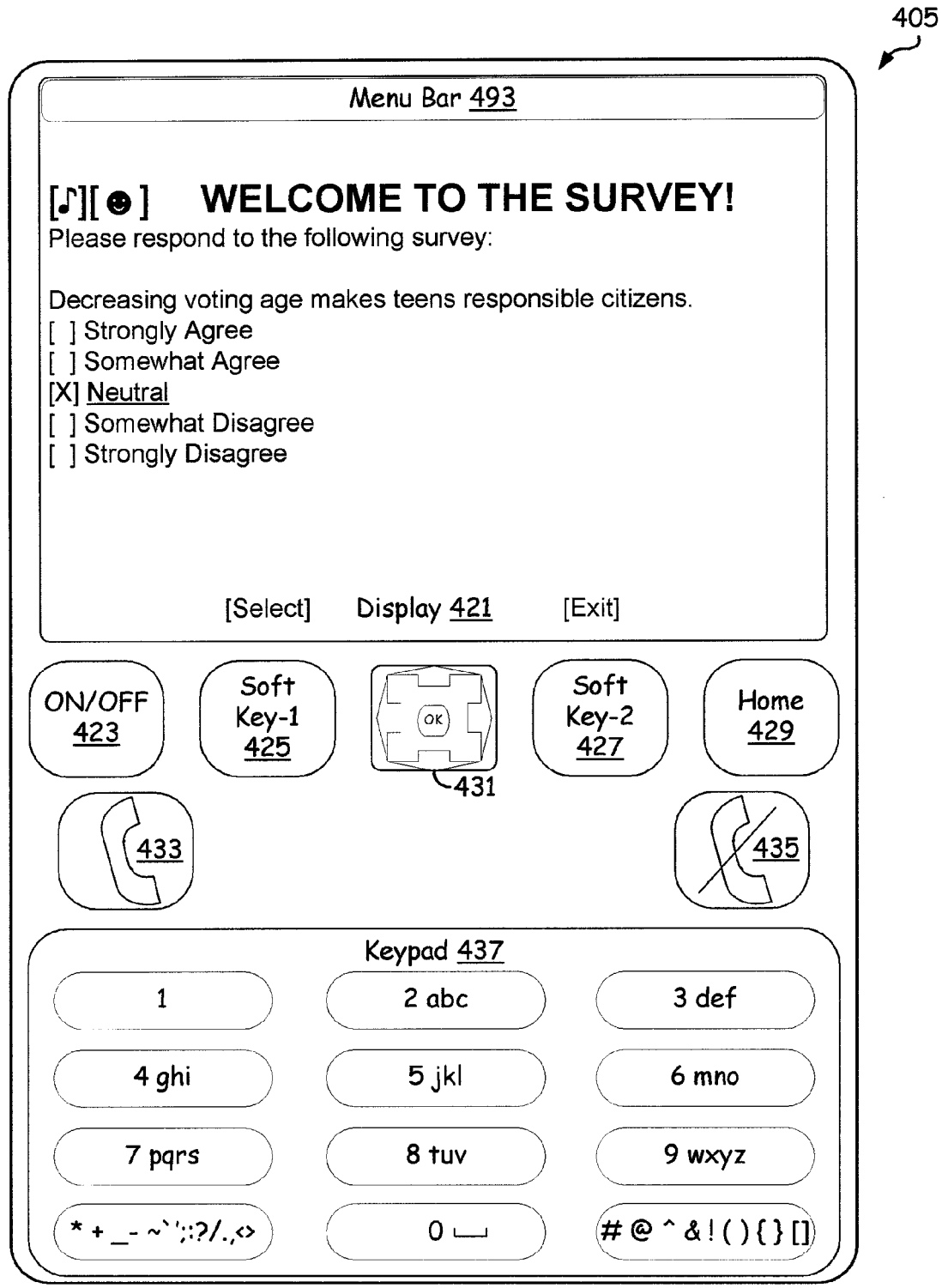
FIG. 4 is an exemplary schematic block diagram illustrating snap shot of a client mobile device displaying a survey questionnaire having age analysis tag.

FIG. 4 is an exemplary schematic block diagram illustrating snap shot of a client mobile device 405 displaying a survey questionnaire having age analysis tag. In the illustration, only two soft keys 425, 427 are considered. A typical client mobile device 405 has a keyboard 437 containing alpha-numeric keypad, an 'ON/OFF' button 423, scrolling keys (up, down, right and left) 431, 'home' button 429, 'call' button 433, 'end call' button 435, soft keys 425, 427 and a display 421. The display 421 contains a menu bar 493 and a display area that in the current illustration shows an exemplary survey questionnaire with age analysis tag.

A title such as 'WELCOME TO THE SURVEY!' may be displayed at the top end of the display (screen) 421. The screen also contains a helpful text such as 'Please respond to the following survey:'. Additional information about the purpose of the survey may be provided in prior screens. The survey questionnaire illustrated exemplifies a typical politics related survey questionnaire wherein the user of the distribution server (129 of FIG. 1) expects age based analysis of the responses. The questionnaire reads 'Decreasing voting age makes teens responsible citizens.', and the multi choice answers given are 'Strongly Agree', 'Somewhat Agree', 'Neutral', 'Somewhat Disagree' and 'Strongly Disagree'. The user may select a choice such as neutral (as illustrated) by scrolling using buttons 431 and selecting by using soft key-1 425 or exit from the survey by clicking on soft key-2 427. Once selected, the distribution server may present next of the survey questionnaire automatically, user of the client mobile device 405 may exit from the survey anytime though. In addition, a selectable icon such as '[♪]', when selected plays audio version of the survey questionnaire and allows the user to select one of multi choice answers in response to the audio questionnaire. Similarly, if available, a selectable icon such as '[●]', when selected plays audio-visual presentation of the survey questionnaire and allows the user to select one of multi choice answers in response.

In this case of age based analysis, the distribution server analyses the responses statistically based upon the responses from a plurality of client mobile devices. The ages may be, for example, groups of 18-24, 25-34, 35-54, 55-69, and 70+, relevant user profile for such an analysis is also collected by the distribution server.

Figure 5:
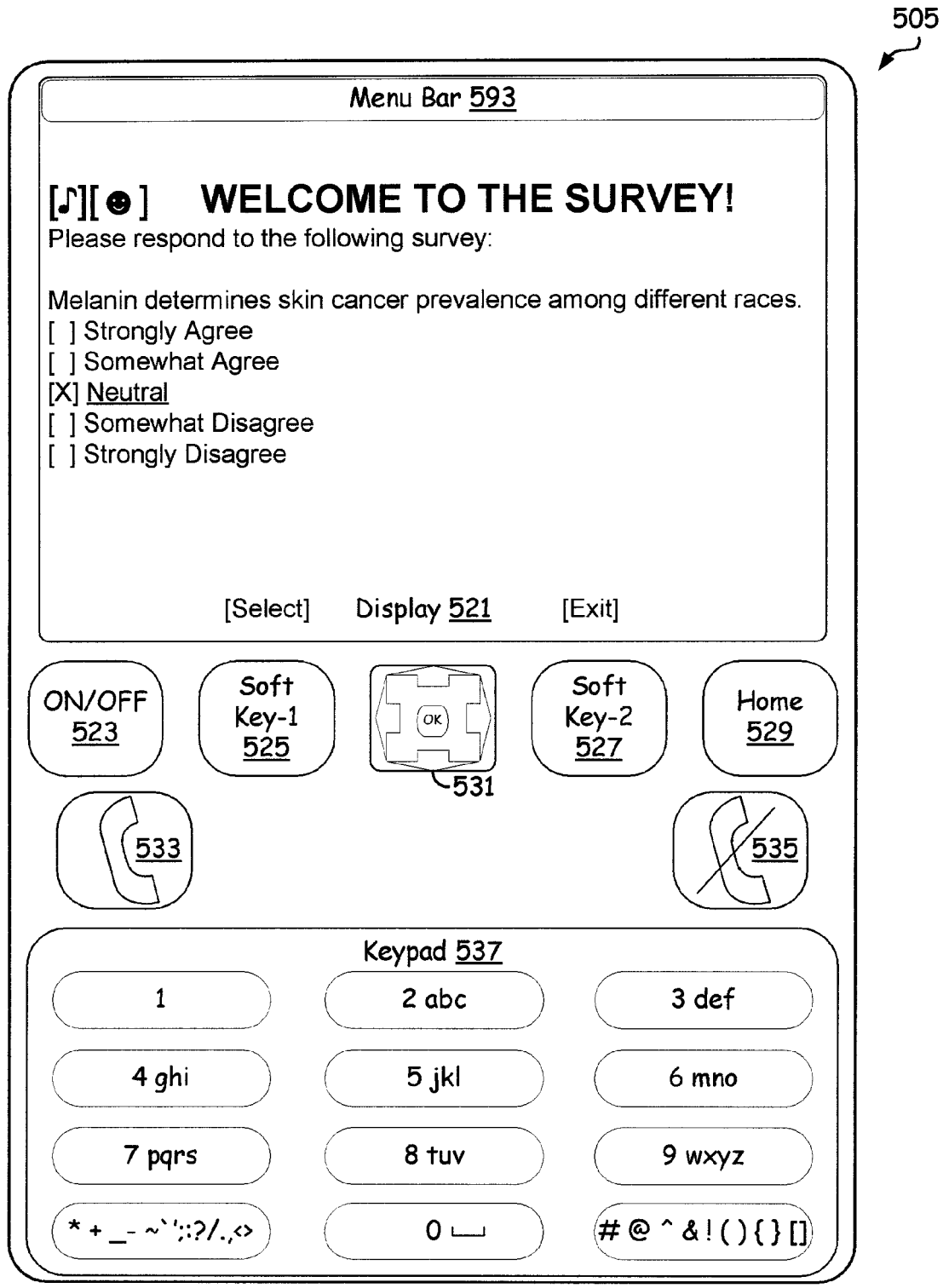
FIG. 5 is an exemplary schematic block diagram illustrating snap shot of a client mobile device displaying a survey questionnaire having race analysis tag.

FIG. 5 is an exemplary schematic block diagram illustrating snap shot of a client mobile device 505 displaying a survey questionnaire having race analysis tag. In the illustration, only two soft keys 525, 527 are considered. A typical client mobile device 505 has a keyboard 537 containing alpha-numeric keypad, an 'ON/OFF' button 523, scrolling keys (up, down, right and left) 531, 'home' button 529, 'call' button 533, 'end call' button 535, soft keys 525, 527 and a display 521. The display 521 contains a menu bar 593 and a display area that in the current illustration shows an exemplary survey questionnaire with race analysis tag.

A title such as 'WELCOME TO THE SURVEY!' may be displayed at the top end of the display (screen) 521. The screen also contains a helpful text such as 'Please respond to the following survey:'. Additional information about the purpose of the survey may be provided in prior screens. The survey questionnaire illustrated exemplifies a typical science related survey questionnaire wherein the user of the distribution server (129 of FIG. 1) expects race based analysis of the responses. The questionnaire reads 'Melanin determines skin cancer prevalence among different races.', and the multi choice answers given are 'Strongly Agree', 'Somewhat Agree', 'Neutral', 'Somewhat Disagree' and 'Strongly Disagree'. The user may select a choice such as neutral (as illustrated) by scrolling using buttons 531 and selecting by using soft key-1 525 or exit from the survey by clicking on soft key-2 527. Once selected, the distribution server may present next of the survey questionnaire automatically, user of the client mobile device 505 may exit from the survey anytime though. In addition, a selectable icon such as '[♪]', when selected plays audio version of the survey questionnaire and allows the user to select one of multi choice answers in response to the audio questionnaire. Similarly, if available, a selectable icon such as '[☻]', when selected plays audio-visual presentation of the survey questionnaire and allows the user to select one of multi choice answers in response.

In race based analysis, the distribution server analyses the responses statistically based upon the responses from a plurality of client mobile devices. The races may be, for example, White, Hispanic, Asian, African American and Other, relevant user profile for such an analysis is also collected by the distribution server.

Figure 6:
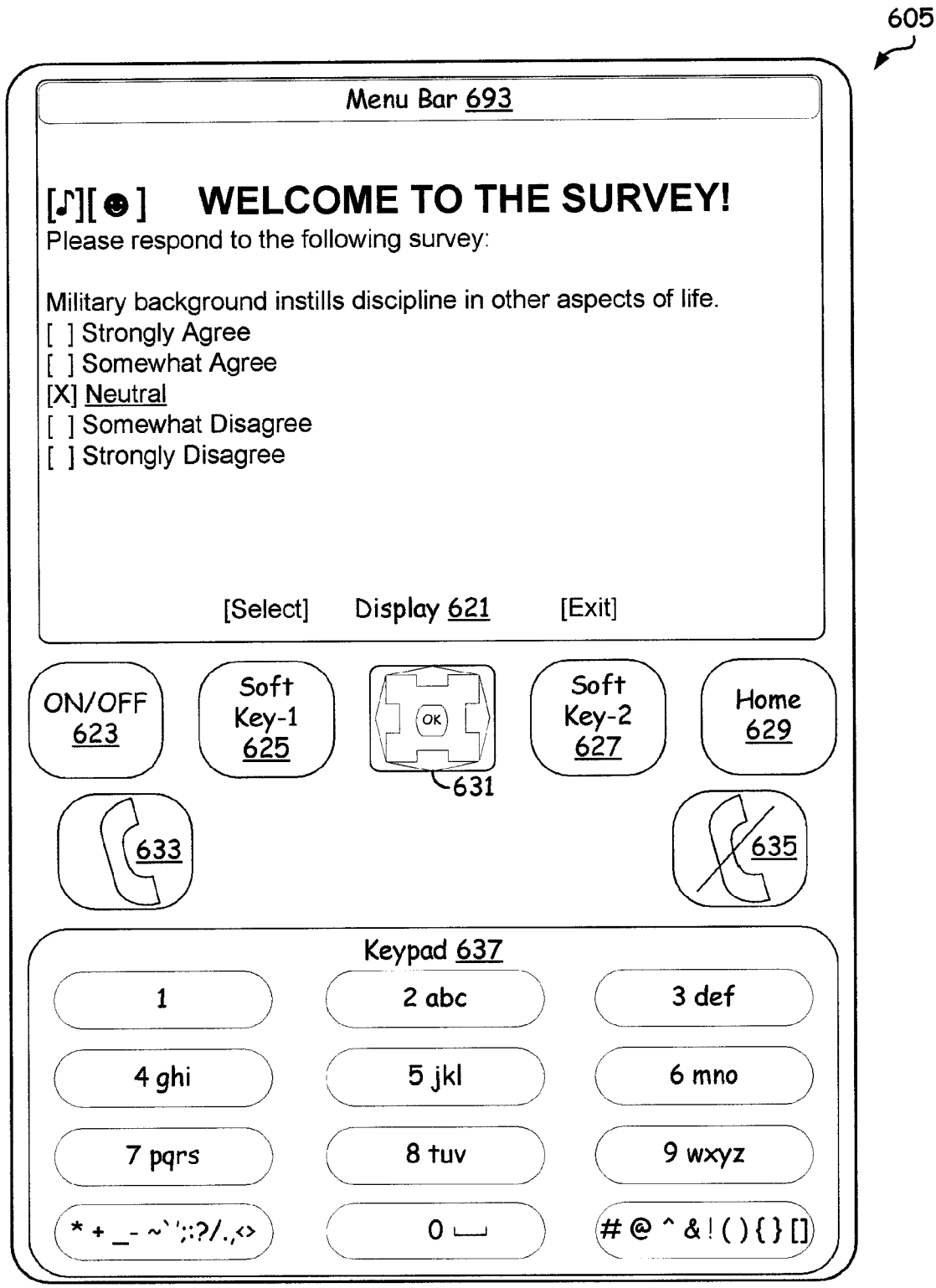
FIG. 6 is an exemplary schematic block diagram illustrating snap shot of a client mobile device displaying a survey questionnaire having other criteria analysis tag.

FIG. 6 is an exemplary schematic block diagram illustrating snap shot of a client mobile device 605 displaying a survey questionnaire having other criteria analysis tag. In the illustration, only two soft keys 625, 627 are considered. A typical client mobile device 605 has a keyboard 637 containing alpha-numeric keypad, an 'ON/OFF' button 623, scrolling keys (up, down, right and left) 631, 'home' button 629, 'call' button 633, 'end call' button 635, soft keys 625, 627 and a display 621. The display contains a menu bar 693 and a display area that in the current illustration shows an exemplary survey questionnaire with other criteria analysis tag.

A title such as 'WELCOME TO THE SURVEY!' may be displayed at the top end of the display (screen) 621. The screen also contains a helpful text such as 'Please respond to the following survey:'. Additional information about the purpose of the survey may be provided in prior screens. The survey questionnaire illustrated exemplifies a typical social science related survey questionnaire wherein the user of the distribution server (129 of FIG. 1) expects race based analysis of the responses. The questionnaire reads 'Military background instills discipline in other aspects of life.', and the multi choice answers given are 'Strongly Agree', 'Somewhat Agree', 'Neutral', 'Somewhat Disagree' and 'Strongly Disagree'. The user may select a choice such as neutral (as illustrated) by scrolling using buttons 631 and selecting by using soft key-1 625 or exit from the survey by clicking on soft key-2 627. Once selected, the distribution server may present next of the survey questionnaire automatically, user of the client mobile device 605 may exit from the survey anytime though. In addition, a selectable icon such as '[♪]', when selected plays audio version of the survey questionnaire and allows the user to select one of multi choice answers in response to the audio questionnaire. Similarly, if available, a selectable icon such as '['[☻]',]', when selected plays audio-visual presentation of the survey questionnaire and allows the user to select one of multi choice answers in response.

In other criteria based analysis, the distribution server analyses the responses statistically based upon the responses from a plurality of client mobile devices. Other criteria may involve survey questions based on ideology, military background, football team affiliations, affiliations to sport teams etc. and relevant user profile for analysis of such survey questionnaire is also collected by the distribution server.

Figure 7:
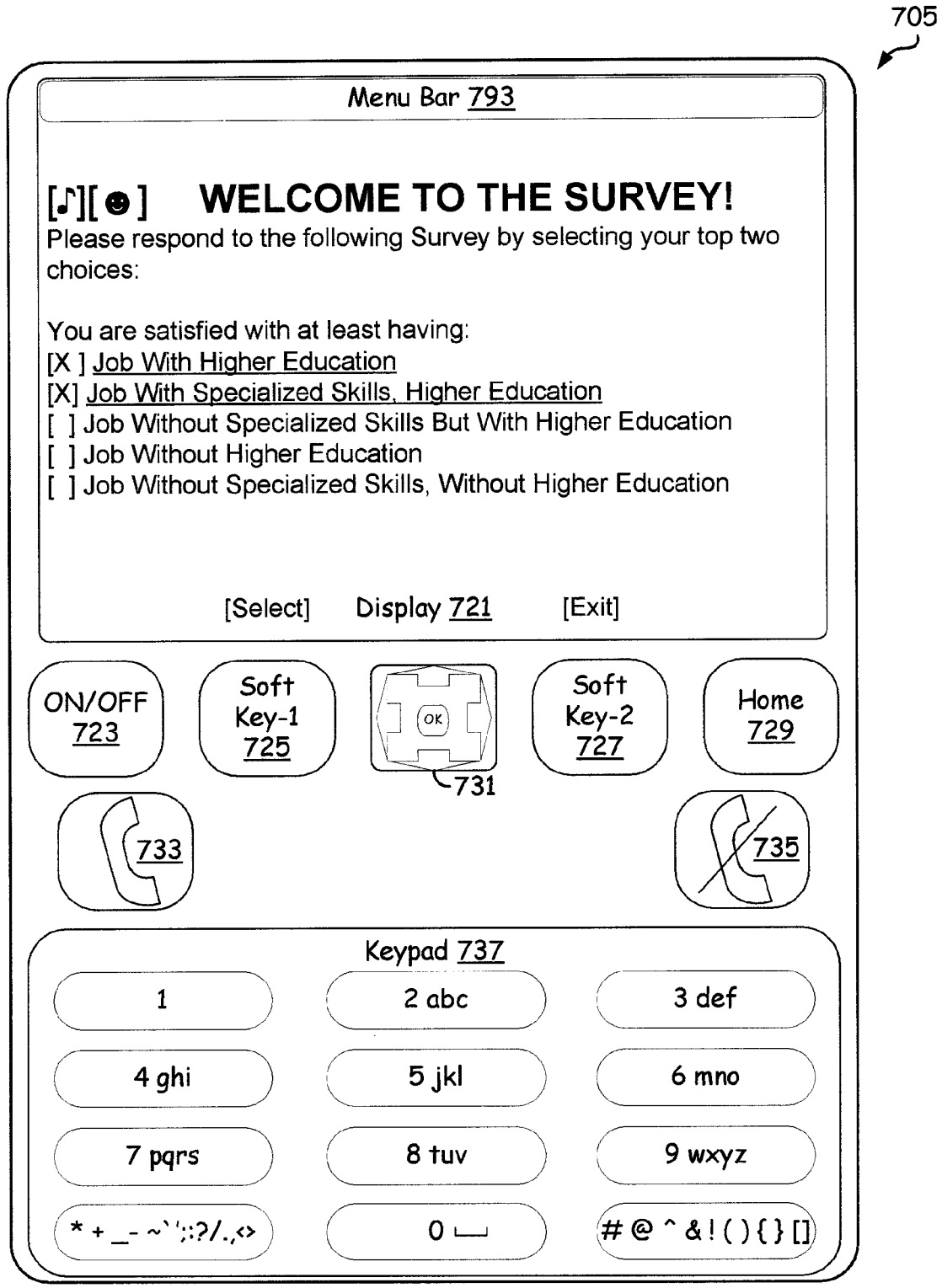
FIG. 7 is an exemplary schematic block diagram illustrating snap shot of a client mobile device displaying a survey questionnaire having high priority analysis tag.

FIG. 7 is an exemplary schematic block diagram illustrating snap shot of a client mobile device 705 displaying a survey questionnaire having high priority analysis tag. In the illustration, only two soft keys 725, 727 are considered. A typical client mobile device 705 has a keyboard 737 containing alpha-numeric keypad, an 'ON/OFF' button 723, scrolling keys (up, down, right and left) 731, 'home' button 729, 'call' button 733, 'end call' button 735, soft keys 725, 727 and a display 721. The display 721 contains a menu bar 793 and a display area that in the current illustration shows an exemplary survey questionnaire with high priority analysis tag.

A title such as 'WELCOME TO THE SURVEY!' may be displayed at the top end of the display (screen) 721. The screen also contains a helpful text such as 'Please respond to the following survey by selecting your top two choices:'. Additional information about the purpose of the survey may be provided in prior screens. The survey questionnaire illustrated exemplifies a typical education and job related survey questionnaire wherein the user of the distribution server (129 of FIG. 1) expects high priority analysis of the responses. The questionnaire reads 'You are satisfied with at least having:', and the multi choice answers given are 'Job with higher education', 'Job With Specialized Skills, Higher Education', 'Job Without Specialized Skills But With Higher Education', 'Job Without Higher Education' and 'Job Without Specialized Skills, Without Higher Education'. The user may select two top priority choices out of five choices given such as 'Job with higher education' and 'Job With Specialized Skills, Higher Education', (as illustrated) by scrolling using buttons 731 and selecting by using soft key-1 725 or exit from the survey by clicking on soft key-2 727. Once two choices are selected, the distribution server may present next of the survey questionnaire automatically, user of the client mobile device 705 may exit from the survey anytime though. In addition, a selectable icon such as '[♪]', when selected plays audio version of the survey questionnaire and allows the user to select two of multi choice answers in response to the audio questionnaire. Similarly, if available, a selectable icon such as '['[☻]',]', when selected plays audio-visual presentation of the survey questionnaire and allows the user to select two of multi choice answers in response. In high priority based analysis, the distribution server analyses the responses statistically based upon the responses from a plurality of client mobile devices.

Figure 8:
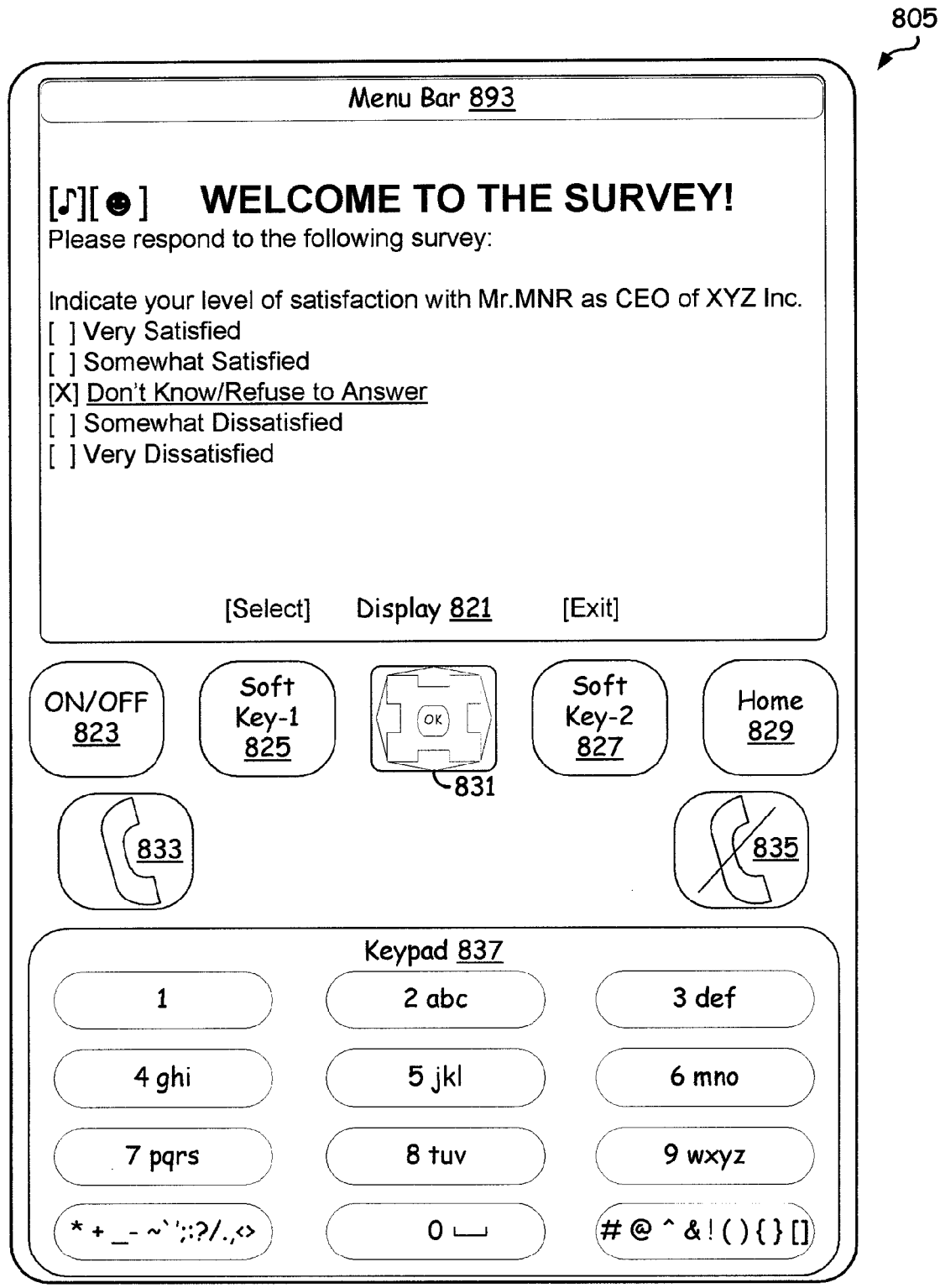
FIG. 8 is an exemplary schematic block diagram illustrating snap shot of a client mobile device displaying a survey questionnaire having satisfaction level analysis tag.

FIG. 8 is an exemplary schematic block diagram illustrating snap shot of a client mobile device 805 displaying a survey questionnaire having satisfaction level analysis tag. In the illustration, only two soft keys 825, 827 are considered. A typical client mobile device 805 has a keyboard 837 containing alpha-numeric keypad, an 'ON/OFF' button 823, scrolling keys (up, down, right and left) 831, 'home' button 829, 'call' button 833, 'end call' button 835, soft keys 825, 827 and a display 821. The display 821 contains a menu bar 893 and a display area that in the current illustration shows an exemplary survey questionnaire with satisfaction level analysis tag.

A title such as 'WELCOME TO THE SURVEY!' may be displayed at the top end of the display (screen) 821. The screen also contains a helpful text such as 'Please respond to the following survey:'. Additional information about the purpose of the survey may be provided in prior screens. The survey questionnaire illustrated exemplifies a typical business related survey questionnaire wherein the user of the distribution server (129 of FIG. 1) expects satisfaction level based analysis of the responses. The questionnaire reads 'Indicate your level of satisfaction with Mr. MNR as CEO of XYZ Inc.:', and the multi choice answers given are 'Very Satisfied', 'Somewhat Satisfied', 'Don't Know/Refuse to Answer', 'Somewhat Dissatisfied' and 'Very Dissatisfied'. The user may select a choice such as 'Don't Know/Refuse to Answer' (as illustrated) by scrolling using buttons 831 and selecting by using soft key-1 825 or exit from the survey by clicking on soft key-2 827. Once selected, the distribution server may present next of the survey questionnaire automatically, user of the client mobile device 805 may exit from the survey anytime though. In addition, a selectable icon such as '[♪]', when selected plays audio version of the survey questionnaire and allows the user to select one of multi choice answers in response to the audio questionnaire. Similarly, if available, a selectable icon such as '[ [ ☻ ] , ]', when selected plays audio-visual presentation of the survey questionnaire and allows the user to select one of multi choice answers in response. In satisfaction level based analysis, the distribution server analyses the responses statistically based upon the responses from a plurality of client mobile devices.

Figure 9:
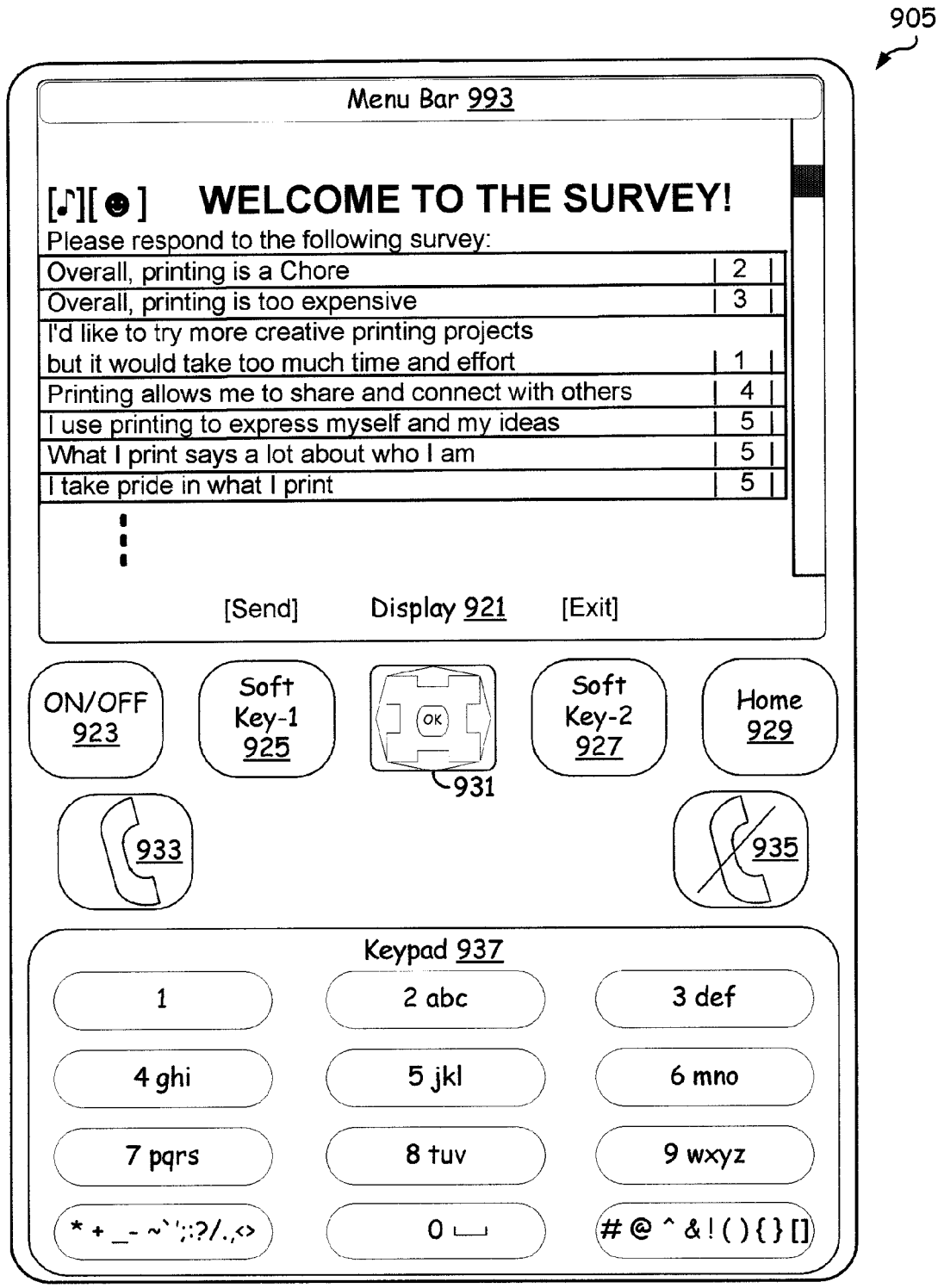
FIG. 9 is an exemplary schematic block diagram illustrating snap shot of a client mobile device displaying a survey questionnaire in a tabular form.

FIG. 9 is an exemplary schematic block diagram illustrating snap shot of a client mobile device 905 displaying a survey questionnaire in a tabular form. In the illustration, only two soft keys 925, 927 are considered. A typical client mobile device 905 has a keyboard 937 containing alpha-numeric keypad, an 'ON/OFF' button 923, scrolling keys (up, down, right and left) 931, 'home' button 929, 'call' button 933, 'end call' button 935, soft keys 925, 927 and a display 921. The display 921 contains a menu bar 993 and a display area that in the current illustration shows an exemplary survey questionnaire in tabular form.

A title such as 'WELCOME TO THE SURVEY!' may be displayed at the top end of the display (screen) 921. The screen also contains a helpful text such as 'Please respond to the following survey:'. Additional information about the purpose of the survey may be provided in prior screens. The survey questionnaire illustrated exemplifies a typical business related survey questionnaire. The questionnaire reads many survey questions and the multi choice answers given are '1: Strongly Agree', '2: Somewhat Agree', '3: Neutral', '4: Somewhat Disagree' and '5: Strongly Disagree'. The user may select a choice (between 1 and 5), as illustrated by scrolling using buttons 931 and selecting a number from keypad 937, send all of the choices by clicking soft key-1 925 or exit from the survey by clicking on soft key-2 927. The user may scroll through the screen to see the bottom part of the table. In addition, a selectable icon such as '[♪]', when selected plays audio version of the survey questionnaire and allows the user to enter a number representing each of the multi choice answers in response to the audio questionnaire. Similarly, if available, a selectable icon such as '[☻]', when selected plays audio-visual presentation of the survey questionnaire and allows the user to enter a number representing each of the multi choice answers.

In general, the present invention makes it possible to support survey questionnaires by modifying its structure (to a tabular form), and instead of using a multi column table for a user to view, a list of issues is displayed, one per row, with each issue/row also providing for a text box that accepts a numeric entry. The numeric entry is provided so that a user could enter a value indicating the selection of one specific response from the selection of responses. The selection of responses (i.e. the allowed responses) are displayed first along with a corresponding index, ordinal value or other numbering schemes (such as '1: Strongly Agree', '2: Somewhat Agree', '3: Neutral', '4: Somewhat Disagree' and '5: Strongly Disagree') just preceding the display of the list of issues for the item in the questionnaire. In one embodiment, the selection of responses are also provided as supplementary information for the corresponding item of the questionnaire that can be optionally viewed (or listened to in audio) by the user. In another embodiment, if wide screen is available, multi column tabular questionnaire may also be employed, with first column containing the issue, and the subsequent columns representing choices such as 'Strongly Agree', 'Somewhat Agree', 'Neutral', 'Somewhat Disagree' and 'Strongly Disagree'. The user may simply go to the corresponding row and column and select it by using one of the soft keys.

Figure 10:
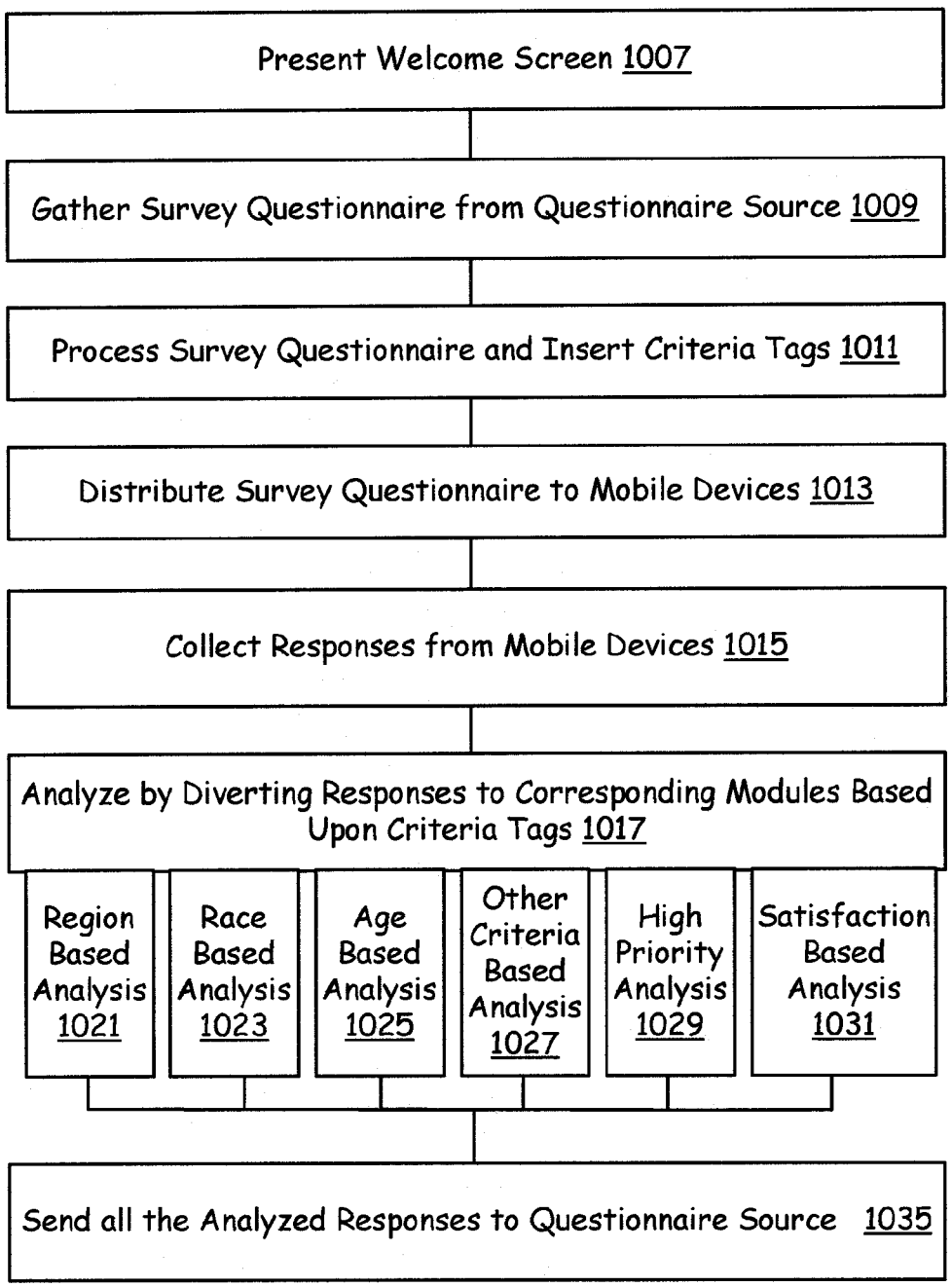
FIG. 10 is a flow diagram illustrating functionality of the distribution server of FIG. 1, in accordance with the present invention.

FIG. 10 is a flow diagram illustrating functionality of the distribution server of FIG. 1, in accordance with the present invention. The functionality begins at a block 1007 when the distribution server presents a welcome screen. The welcome screen may be an audio, audio visual or a textual presentation (depending on the client mobile device's features), and explains the purpose of the survey, number of questions it contains and approximate time it may take to answer those questions. At a next block 1009, the distribution server gathers survey questionnaire from a questionnaire source. The questionnaire source may be any personal computer or laptop computer associated with the distribution server. The user logs in, registers, makes necessary payments for the services and delivers survey questionnaire to the distribution server.

At a next block 1011, the distribution server processes the survey questionnaire and inserts criteria tags. The processing may include formatting the questionnaire to fit each individual client mobile device based upon the screen size and the number of soft keys available. The survey questionnaire may be formatted as one question per screen with multi choice answers, or multiple questions per screen in a tabular form. The criteria tags may include region based analysis, race based analysis, age based analysis, other criteria based analysis, high priority analysis and/or satisfaction level analysis.

At a next block 1013, the distribution server distributes the survey questionnaire to the plurality of client mobile devices. At a next block 1015, the distribution server collects responses from the client mobile devices. The collecting of responses may go on until a preset expiry date stops the process of collecting responses. At a next block 1017, the distribution server analyzes the responses by diverting responses to corresponding criteria based analysis modules, based upon criteria tags. The analysis may take form of one of region based analysis at a block 1021, race based analysis at a block 1023, age based analysis at a block 1025, other criteria based analysis at a block 1027, high priority analysis at a block 1029 and/or satisfaction level analysis at a block 1031, among other possibilities. At a next block 1035, the distribution server send all of the analyzed responses to the questionnaire source.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method of collecting data from a survey by a system to generate insights into people's behavior, the method comprising:
   creating a survey online or uploading the survey, by a survey source, wherein the survey comprises multiple questions that can be presented one question at a time;
   specifying number of responses desired and one or more criteria for identifying targets for the survey;
   delivering or presenting the survey to users, based on the one or more criteria, to the targets identified;
   providing an incentive for the plurality of responders to not only provide answers to the survey but also provide details of themselves in a profile;
   gathering user responses to the presented survey by presenting each of a plurality of responders individually one question at a time;
   automatically aggregating user responses from the plurality of responders into a raw data, analyzing user responses to generate a survey results, providing the raw data and the survey results back to a survey source through an online interface or via email;
   and
   collecting, automatically, responder information for the plurality of responders that is relevant to the survey and using it to generate results for the survey, and also using it to determine targets for other surveys, to correlate with other behavior of the plurality of responders, as well as to analyze responses received from those other surveys and to generate other results.

2. The method of claim 1 wherein a profile with demographic information associated with the one of the plurality of responders, or a reference to a profile with demographic information associated with that responder, is communicated along with the user responses, wherein the profile comprises one or more items from the set comprising a name, age, employment, address, phone numbers, race, political affiliations, salary, family size, ideology, military background and team affiliations.

3. The method of claim 1 wherein survey results are delivered to the survey source as they come in, or optionally staggered across multiple aggregated deliveries.

4. The method of claim 1 wherein survey results comprise statistical figures to summarize and interpret responses, highlight regional trends, correlation to other behavior of responders, correlation to other preferences of the plurality of responders and correlation to educational level of the plurality of responders.

5. The method of claim 1 wherein the survey results comprise:
   information highlighting differences in responses based on age, gender, region, experiences, ideology, military background, team affiliations, race, political affiliations, salary, and family size; and
   information obtained by statistical methods applied on the responses to arrive at various statistical figures; and
   statistically significant information.

6. The method of claim 1 wherein the one or more criteria for identifying targets for the survey comprises one or more items from the set comprising age, employment, address, phone numbers, race, political affiliations, salary, family size, ideology, military background and team affiliations.

7. The method of claim 1 further comprising:
accepting payments for distributing a survey;
specifying criteria tags to assist distribution and to identify the type of analysis required on the responses received and on the results reported.

8. A system for distributing surveys, collecting data and generating insights into people, the system comprising:
a distribution server, communicatively coupled to mobile devices and computers of users, that facilitates creation, by a survey source, of a survey online as well as the uploading of the survey, wherein the survey comprises multiple questions that can be presented one question at a time;
a database to store and retrieve the survey;
the distribution server facilitating the specification, and storage in the database, of number of responses desired and of one or more criteria used to identify targets for the survey;
the distribution server delivering or presenting online the survey to users based on the one or more criteria, wherein the users employ their corresponding mobile devices and computers to interact with the distribution server;
the distribution server providing an incentive for the users to not only provide answers to the survey but also provide details of themselves in a profile;
the distribution server gathering user responses to the presented survey and storing them in the database, or selectively communicating them to an external server associated with the survey source;
the distribution server automatically aggregating user responses into a raw data, analyzing the raw data to generate a survey results, and providing the raw data and survey results to the survey source via email or through an online interface that is accessible by the external server;
and
the distribution server collecting, automatically, responder information for the users that is relevant to the survey and using it to generate results for the survey, and also using it to determine targets for other surveys, to correlate with other behavior of the users, as well as to analyze responses received from those other surveys and to generate other results.

9. The system of claim 8 further comprising:
the distribution server receives a profile associated with a corresponding user, or a reference to a profile associated with corresponding user, along with the user responses communicated by the mobile devices and computers communicatively coupled to the distribution server; and
the distribution analyzes the results employing the profile associated with the corresponding users, wherein the profile for each of the users comprises one or more items from the set comprising name, age, employment, address, phone numbers, race, political affiliations, salary, family size, ideology, military background and team affiliations.

10. The system of claim 9 wherein the distribution server delivers the survey to users based on the profile of the users and the one or more criteria set by the source for the survey.

11. The system of claim 8 wherein a subset of the users are determined to be targets for the survey based on their demographic profile data that is saved in the database, received from mobile devices or computers of the users, or accessible from an external server that manages demographic profile data.

12. The system of claim 8 wherein survey results comprise statistical figures to summarize and interpret user responses, highlight regional trends, highlight correlation to other behavior of responders, determine correlation to other preferences of responders and to determine correlation to educational level of responders.

13. The system of claim 8 wherein the survey results comprise:
information highlighting differences in responses based on age, gender, region, experiences, ideology, military background, team affiliations, race, political affiliations, salary, and family size;
information obtained by statistical methods applied on the responses to arrive at various statistical figures; and
statistically significant information.

14. The system of claim 8 wherein the survey also provides downloadable content such as an image, an audio and a video clip that the users can download and store locally in their respective mobile devices or computers.

\* \* \* \* \*